US012592422B2

(12) United States Patent
Kim et al.

(10) Patent No.: US 12,592,422 B2
(45) Date of Patent: Mar. 31, 2026

(54) BATTERY FIRE DETECTION DEVICE AND ENERGY STORAGE SYSTEM DETERMINING A RISK OF FIRE OR A FIRE

(71) Applicant: SK ON CO., LTD., Seoul (KR)

(72) Inventors: Suk Chul Kim, Daejeon (KR); Dae Won Kwon, Daejeon (KR); Yong Uk Kim, Daejeon (KR); Jong Ho Seok, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/422,631

(22) Filed: Jan. 25, 2024

(65) Prior Publication Data

US 2024/0170747 A1 May 23, 2024

Related U.S. Application Data

(63) Continuation of application No. 17/525,578, filed on Nov. 12, 2021, now Pat. No. 11,923,517.

(30) Foreign Application Priority Data

Nov. 12, 2020 (KR) ........................ 10-2020-0151359

(51) Int. Cl.
*H01M 10/48* (2006.01)
*H01M 10/42* (2006.01)
*H01M 50/143* (2021.01)

(52) U.S. Cl.
CPC ..... *H01M 10/486* (2013.01); *H01M 10/4207* (2013.01); *H01M 50/143* (2021.01)

(58) Field of Classification Search
CPC ........... H01M 10/486; H01M 10/4207; H01M 50/143
See application file for complete search history.

(56) References Cited

U.S. PATENT DOCUMENTS

2011/0059341 A1* 3/2011 Matsumoto ......... H01M 10/052
429/82
2019/0140235 A1 5/2019 Lindstrom et al.

FOREIGN PATENT DOCUMENTS

KR 10-2018-0092521 A 8/2018
KR 102022075 B1 * 9/2019
KR 20210076261 A * 6/2021

OTHER PUBLICATIONS

KR 20210076261 English Translation (Year: 2019).*
KR 102022075 English Translation (Year: 2019).*
WO 2018139737 English Translation (Year: 2018).*
Sascha Koch et al., "Fast Thermal Runaway Detection for Lithium-Ion Cells in Large Scale Traction Batteries" (Year: 2018).*
J. G. Quinteire, "Literature Review: Packaging Technique to Defeat Fires and Explosions due to Lithium-ion and Related High-Energy-Density Batteries" (Year: 2020).*
Office Action for Korean Patent Application No. 10-2020-0151359 issued by the Korean Patent Office on May 12, 2025.

* cited by examiner

*Primary Examiner* — Jimmy Vo
(74) *Attorney, Agent, or Firm* — IP & T GROUP LLP

(57) ABSTRACT

A battery fire detection device according to an embodiment includes: a first sensor configured to detect whether a gas vent of a battery cell is opened; a second sensor configured to detect a temperature of the battery cell; and a controller configured to determine whether there is a risk of fire or whether a fire occurs in the battery cell based on detection results of the first sensor and the second sensor.

9 Claims, 9 Drawing Sheets

BATTERY FIRE DETECTION DEVICE AND ENERGY STORAGE SYSTEM DETERMINING A RISK OF FIRE OR A FIRE

CROSS-REFERENCE TO RELATED APPLICATION(S)

This application is a continuation application of U.S. patent application Ser. No. 17/525,578 filed on Nov. 12, 2021, which claims priority to Korean Patent Application No. 10-2020-0151359 filed on Nov. 12, 2020 in the Korean Intellectual Property Office (KIPO). The entire disclosure of each of the foregoing applications is incorporated by reference herein.

BACKGROUND

1. Field

The present invention relates to a battery fire detection device and a method of detecting a fire in a battery, and an energy storage system.

2. Description of the Related Art

Generally, an energy storage system (ESS) refers to a storage system which stores power excessively generated in a power plant and transmits the power when power generation is insufficient. In recent years, a case, in which a large-scale ESS device is configured in a small size and used in buildings, factories, homes, and the like to prepare for a blackout or reduce peak power demands, has been increased.

Recently, as interest in new renewable energy has rapidly increased due to an imbalance between power supply and demand, developments of techniques to store electricity produced by using new renewable energy and use it at the required time through the ESS are continuously being made.

In particular, as installations of the ESSs in newly constructed public buildings have become compulsory in Korea, and installations of ESSs in private buildings are increased in terms of energy saving, the ESS market continues to grow in recent years.

These ESSs have a disadvantage in that they are vulnerable to high temperatures. In particular, an ESS in which lithium-ion battery cells are intensively installed to store electric power therein has a problem in that when a fire occurs in a battery cell, the fire is transferred to adjacent battery cells and may spread to become a large fire in the entire system.

Therefore, research into a device and a method capable of detecting a risk of fire or when a fire occurs in the battery cell at an early stage to suppress the occurrence of fire and minimize damage has been conducted.

SUMMARY

It is an object of the present invention to provide a battery fire detection device and a method for determining whether there is a risk of fire or whether a fire occurs in a battery cell, and an energy storage system.

To achieve the above object, according to an aspect of the present invention, there is provided a battery fire detection device including: a first sensor configured to detect whether a gas vent of a battery cell is opened; a second sensor configured to detect a temperature of the battery cell; and a controller configured to determine whether there is a risk of fire or whether a fire occurs in the battery cell based on detection results of the first sensor and the second sensor.

When the gas vent of the battery cell is opened, the controller may determine a temperature and a temperature change of the battery cell after the gas vent is opened, and may determine whether there is a risk of fire or whether a fire occurs in the battery cell based on the temperature and the temperature change of the battery cell after the gas vent is opened.

When the temperature of the battery cell is decreased by a second temperature or higher from a first temperature or higher for a first period of time after the gas vent is opened, the controller may determine that the battery cell is at risk of fire or in which a fire has occurred therein.

The first temperature may be 100° C., the first period of time may be 5 seconds, and the second temperature may be 5° C.

If the gas vent of the battery cell is not opened, the controller may determine the temperature change of the battery cell while the gas vent is not opened, and may determine whether there is a risk of fire or whether a fire occurs in the battery cell based on the temperature change of the battery cell while the gas vent is not opened.

When the temperature of the battery cell is increased by a third temperature or higher for a second period of time while the gas vent is not opened, the controller may determine that the battery cell is at risk of fire or in which a fire has occurred therein.

The second period of time may be 1 second, and the third temperature may be 10° C.

In addition, according to another aspect of the present invention, there is provided an energy storage system including: a battery rack; a cooling device configured to cool battery cells included in the battery rack; a battery fire detection device configured to determine whether there is a risk of fire or whether a fire occurs in the battery cell included in the battery rack; and a battery management system configured to execute a fire coping measure when there is a battery cell at risk of fire or in which a fire has occurred therein, wherein the battery fire detection device includes: a first sensor configured to detect whether a gas vent of the battery cell is opened; a second sensor configured to detect a temperature of the battery cell; and a controller configured to determine whether there is a risk of fire or whether a fire occurs in the battery cell based on detection results of the first sensor and the second sensor.

The battery rack may include: a housing; a plurality of battery modules which are stacked in the housing and include a plurality of battery cells; and cooling passages and flame passages which are physically separated from each other.

The cooling passages may be formed in upper and lower spaces of the stacked battery modules, spaces between the stacked battery modules, and a space on a rear cover side of the housing, and the flame passage may be formed in spaces on both-side covers side of the housing.

When there is a battery cell at risk of fire or in which a fire has occurred therein, the battery management system may drive the cooling device to cool the battery cell at risk of fire or in which a fire has occurred therein.

When there is a battery cell at risk of fire or in which a fire has occurred therein, the battery management system may generate and provide a predetermined warning message to a user.

When there is a battery cell at risk of fire or in which a fire has occurred therein, the battery management system may cut off power supply to the battery cell or the battery rack at risk of fire or in which a fire has occurred therein.

Further, according to another aspect of the present invention, there is provided a method of detecting a fire in a battery including: detecting whether a gas vent of a battery cell is opened; detecting a temperature of the battery cell; and determining whether there is a risk of fire or whether a fire occurs in the battery cell based on detection results of whether the gas vent is opened and detection results of the temperature.

The step of determining whether there is a risk of fire or whether a fire occurs in the battery cell may include: when the gas vent of the battery cell is opened, determining a temperature and a temperature change of the battery cell after the gas vent is opened; and determining whether there is a risk of fire or whether a fire occurs in the battery cell based on the temperature and the temperature change of the battery cell after the gas vent is opened.

The step of determining whether there is a risk of fire or whether a fire occurs in the battery cell based on the temperature and the temperature change may include when the temperature of the battery cell is decreased by a second temperature or higher from a first temperature or higher for a first period of time after the gas vent is opened, determining that the battery cell is at risk of fire or in which a fire has occurred therein.

The first temperature may be 100° C., the first period of time may be 5 seconds, and the second temperature may be 5° C.

The step of determining whether there is a risk of fire or whether a fire occurs in the battery cell may include: if the gas vent of the battery cell is not opened, determining a temperature change of the battery cell while the gas vent is not opened; and determining whether there is a risk of fire or whether a fire occurs in the battery cell based on the temperature change of the battery cell while the gas vent is not opened.

The step of determining whether there is a risk of fire or whether a fire occurs in the battery cell based on the temperature change may include: when the temperature of the battery cell is increased by a third temperature or higher for a second period of time while the gas vent is not opened, determining that the battery cell is at risk of fire or in which a fire has occurred therein.

The second period of time may be 1 second, and the third temperature may be 10° C.

According to the present invention, it is possible to detect an occurrence of an abnormal situation in the battery cell at an early stage to suppress an occurrence of fire and minimize damage due to the fire.

According to the present invention, through the battery rack having a structure in which the cooling passages and the flame passages are physically separated, it is possible to cool a cell in which a fire has occurred and adjacent cells through the cooling passages without affecting the flame passages when the battery cell ignites, thereby effectively suppressing the spread of fire.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
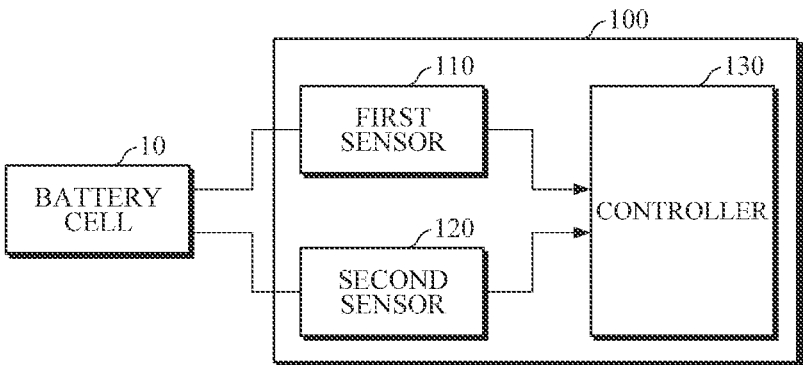
FIG. 1 is a block diagram illustrating a battery fire detection device according to an embodiment.

Hereinafter, embodiments will be described in detail with reference to the accompanying drawings. In denoting reference numerals to components of respective drawings, it should be noted that the same components will be denoted by the same reference numerals although they are illustrated in different drawings.

In description of preferred embodiments of the present invention, the publicly known functions and configurations that are judged to be able to make the purport of the present invention unnecessarily obscure will not be described in detail. Further, wordings to be described below are defined in consideration of the functions of the embodiments, and may differ depending on the intentions of a user or an operator or custom. Accordingly, such wordings should be defined on the basis of the contents of the overall specification.

It will be understood that, although the terms first, second, etc. may be used herein to describe various elements or components, these elements or components should not be limited by these terms. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or a combination thereof, but do not preclude the presence or addition of one or more other features, integers, steps, operations, elements, components, and/or a combination thereof.

Further, directional terms such as "one side," "the other side," "upper," "lower," and the like are used in connection with the orientation of the disclosed drawings. Since the elements or components of the embodiments of the present invention may be located in various orientations, the directional terms are used for illustrative purposes, and are not intended to limit the present invention thereto.

In addition, a division of the configuration units in the present disclosure is intended for ease of description and divided only by the main function set for each configuration unit. That is, two or more of the configuration units to be described hereinafter may be combined into a single configuration unit or formed by two or more of divisions by function into more than a single configuration unit. Further, each of the configuration units to be described hereinafter may additionally perform a part or all of the functions among functions set for other configuration units other than being responsible for the main function, and a part of the functions among the main functions set for each of the configuration units may be exclusively taken and certainly performed by other configuration units FIG. 1 is a block diagram illustrating a battery fire detection device according to an embodiment.

Referring to FIG. 1, a battery fire detection device 100 according to an embodiment may include a first sensor 110, a second sensor 120 and a controller 130.

The first sensor 110 may detect whether a gas vent of the battery cell 10 is opened. The gas vent may be a hole or an opening through which a gas generated by a chemical reaction of the battery cell 10 is discharged. The first sensor 110 may include a gas sensor or a motion sensor, etc. to detect whether the gas vent is opened. For example, the first sensor 110 may include a gas sensor, and by detecting the gas discharged from the battery cell 10 through the gas sensor, it is possible to detect whether the gas vent of the battery cell 10 is opened. As another example, the first sensor 110 may include a motion sensor, and by detecting the opening of a cover of the gas vent, etc. through the motion sensor, it is possible to detect whether the gas vent of the battery cell 10 is opened.

The second sensor 120 may detect a temperature of the battery cell 10. To this end, the second sensor 120 may include a temperature sensor.

The controller 130 may control an overall operation of the battery fire detection device 100. According to an embodiment, the controller 130 may include one or more processors, or may include one or more processors and one or more memories.

The controller 130 may determine whether there is a risk of fire or whether a fire occurs in the battery cell 10 based on the detection results of the first sensor 110 and the second sensor 120. That is, the controller 130 may determine whether the battery cell 10 is at risk of fire or in which a fire has occurred therein based on detection results of whether the gas vent of the battery cell 10 is opened and detection results of the temperature of the battery cell 10.

For example, when the gas vent of the battery cell 10 is opened as the detection results of the first sensor 110, the controller 130 may determine a temperature and a temperature change of the battery cell 10 after the gas vent is opened based on the detection results of the second sensor 120. In addition, when the temperature of the battery cell 10 is decreased by a second temperature or higher from a first temperature or higher for a first period of time after the gas vent is opened, the controller 130 may determine that the battery cell 10 is at risk of fire or in which a fire has occurred therein. In this case, the first temperature may be 100° C., the first period of time may be 5 seconds, and the second temperature may be 5° C., but this is only an example and it is not limited thereto. That is, the first temperature, the first period of time, and the second temperature may be variously changed depending on types of the battery cell, operating environment of the battery cell and the like.

As another example, if the gas vent of the battery cell is not opened as the detection results of the first sensor 110, the controller 130 may determine the temperature change of the battery cell 10 while the gas vent is not opened based on the detection results of the second sensor 120. In addition, when the temperature of the battery cell 10 is increased by a third temperature or higher for a second period of time while the gas vent is not opened, the controller 130 may determine that the battery cell 10 is at risk of fire or in which a fire has occurred therein. In this case, the second period of time may be 1 second and the third temperature may be 10° C., but this is only an example and it is not limited thereto. That is, as described above, the second period of time and the third temperature may be variously changed depending on the types of the battery cell, the operating environment of the battery cell and the like.

When it is determined that the battery cell 10 is at risk of fire or in which a fire has occurred therein, the controller 130 may execute a fire coping measure.

For example, when it is determined that the battery cell 10 is at risk of fire or in which a fire has occurred therein, the controller 130 may drive a cooling device to cool the battery cell 10. Alternatively, the controller 130 may send a signal for warning of a risk of fire or an occurrence of fire to a system controller (e.g., a battery management system (BMS), etc.) that controls an operation of the system using the battery cell 10, thereby allowing the system controller to drive the cooling device so as to cool the battery cell 10. In this case, the cooling device is provided inside or outside the battery fire detection device 100, and various cooling methods such as a gas cooling method for cooling the battery cell with a gas or a liquid cooling method for cooling the battery cell with a liquid may be used.

As another example, when it is determined that the battery cell 10 is at risk of fire or in which a fire has occurred therein, the controller 130 may generate a predetermined warning signal to warn a user. Alternatively, the controller 130 may send a signal for warning of the risk of fire or occurrence of fire to the above-described system controller, thereby allowing the system controller to warn the user. In this case, various warning methods such as a visual method, an auditory method, a tactile method, and the like may be used.

As another example, when it is determined that the battery cell 10 is at risk of fire or in which a fire has occurred therein, the controller 130 may cut off power supply to the battery cell 10 to stop the operation of the system using the battery cell 10. Alternatively, the controller 130 may send a signal for warning of a risk of fire or an occurrence of fire to the above-described system controller, thereby allowing the system controller to stop the operation of the system by cutting off the power supply to the battery cells 10.

Figure 2:
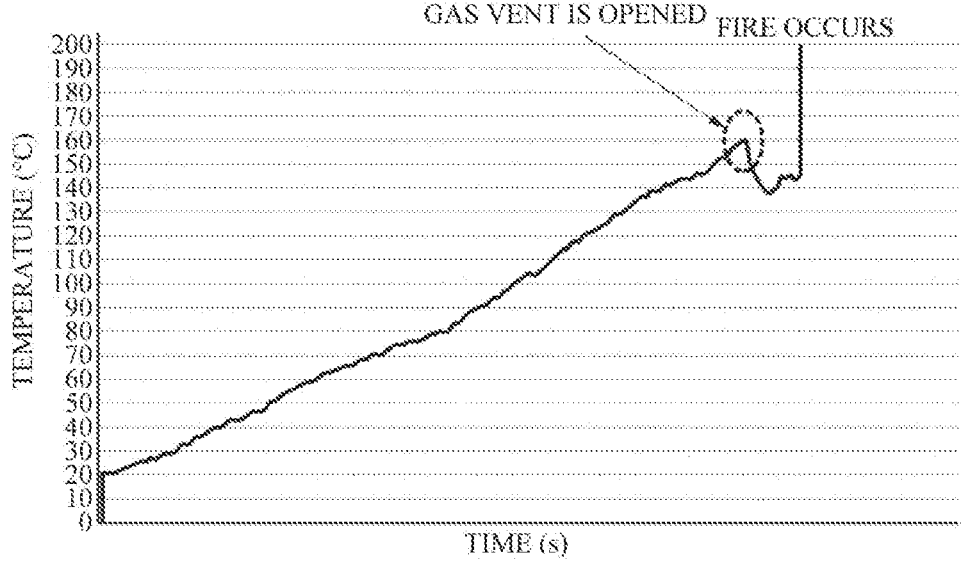
FIG. 2 is an exemplary graph for describing a change in temperature state of a battery cell over time when a fire occurs.

FIG. 2 is an exemplary graph for describing a change in temperature state of a battery cell over time when a fire occurs.

Referring to FIG. 2, a phenomenon, in which a temperature of the battery cell is increased with use and the temperature of the battery cell itself is decreased as the gas vent is opened before an occurrence of fire, occurs. In the case of the illustrated example, it can be seen that the gas vent of the battery cell is opened at 160° C., and the temperature of the battery cell itself drops to about 138° C., and then a fire occurs after a predetermined time has elapsed.

Accordingly, the battery fire detection device 100 (see FIG. 1) according to an embodiment may determine whether there is a risk of fire or whether a fire occurs in the battery cell by using the above-described phenomenon. For example, in the battery fire detection device 100 (see FIG. 1) according to an embodiment, after the gas vent of the battery cell is opened, when the temperature of the battery cell is decreased by the second temperature (e.g., 5° C.) from the first temperature (e.g., 100° C.) for the first period of time (e.g., 5 seconds), it may be determined that the battery cell 10 is at risk of fire or in which a fire has occurred therein.

Figure 3:
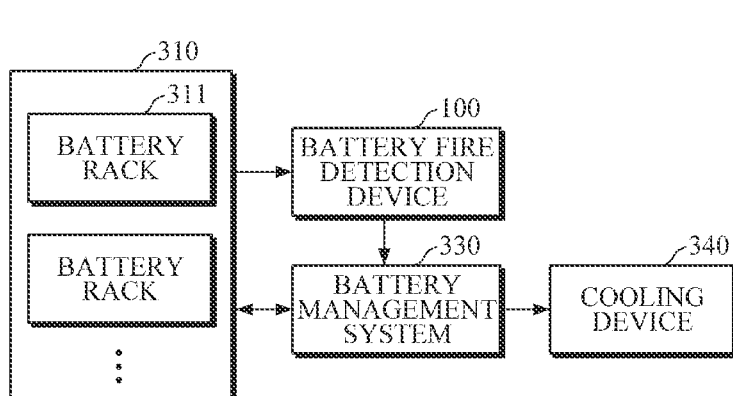
FIG. 3 is a block diagram illustrating an energy storage system according to an embodiment.

FIG. 3 is a block diagram illustrating an energy storage system according to an embodiment.

Referring to FIG. 3, an energy storage system 300 according to an embodiment may include a battery 310, a battery fire detection device 100, a battery management system 330 and a cooling device 340.

The battery 310 may include one or more battery racks 311. The battery rack 311 may include a plurality of battery modules, and each battery module may include a plurality of battery cells.

The battery fire detection device 100 may detect whether there is a risk of fire or whether a fire occurs in each battery cell included in the battery rack 311. The battery fire detection device 100 is the same as those of the configuration described with reference to FIG. 1, and therefore will not be described in detail.

The battery management system 330 may control charging and discharging of the battery 310 and control power supply to the battery 310.

The battery management system 330 may execute a fire coping measure when there is a battery rack 311 or a battery cell at the risk of fire or in which a fire has occurred therein.

For example, when receiving a signal for warning of a risk of fire or an occurrence of fire of the battery cell included in the battery rack 311 from the battery fire detection device 100, the battery management system 330 may drive the cooling device 340 to cool the battery cell at risk of fire or in which a fire has occurred therein, or the battery module or battery rack including the battery cell at risk of fire or in which a fire has occurred therein.

As another example, when receiving a signal for warning of a risk of fire or an occurrence of fire of the battery cell included in the battery rack 311 from the battery fire detection device 100, the battery management system 330 may generate a predetermined warning message to warn the user.

As another example, when receiving a signal for warning of a risk of fire or an occurrence of fire of the battery cell included in the battery rack 311 from the battery fire detection device 100, the battery management system 330 may cut off power supply to a battery cell at risk of fire or in which a fire has occurred therein, or the battery module or battery rack including the battery cell at risk of fire or in which a fire has occurred therein, thus to stop the operation of the system which uses the battery cell at risk of fire or in which a fire has occurred therein, or the battery module or battery rack including the battery cell at risk of fire or in which a fire has occurred therein.

The cooling device 340 may cool the battery 310 under the control of the battery management system 330 or the battery fire detection device 100. For example, the cooling device 340 may use various cooling methods such as a gas cooling method for cooling the battery with a gas or a liquid cooling method for cooling the battery with a liquid.

Figure 4:
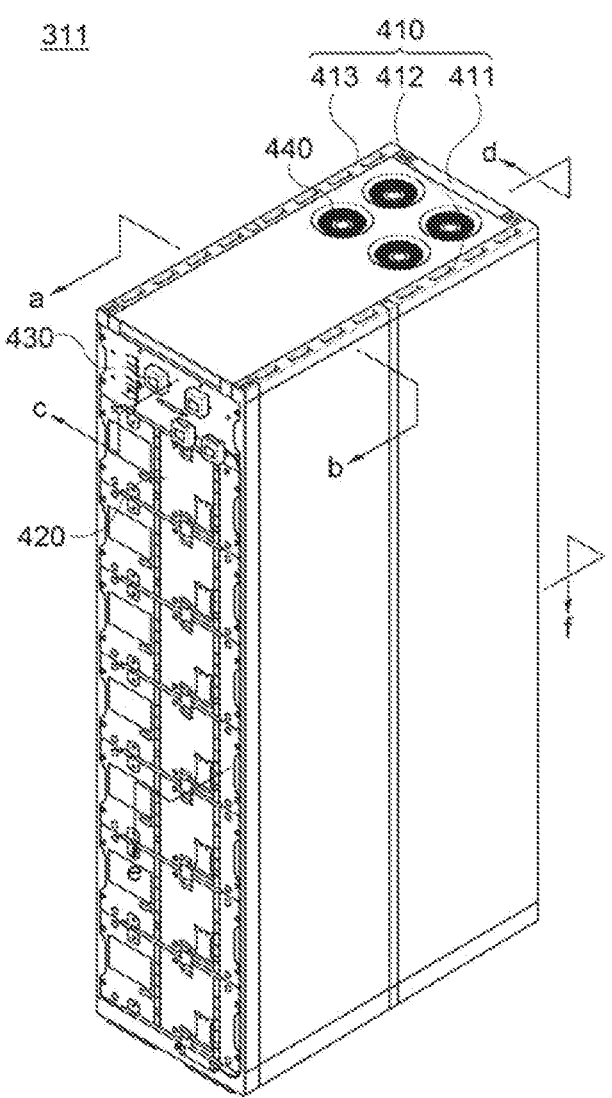
FIG. 4 is a view illustrating a battery rack according to an embodiment.
Figure 5:
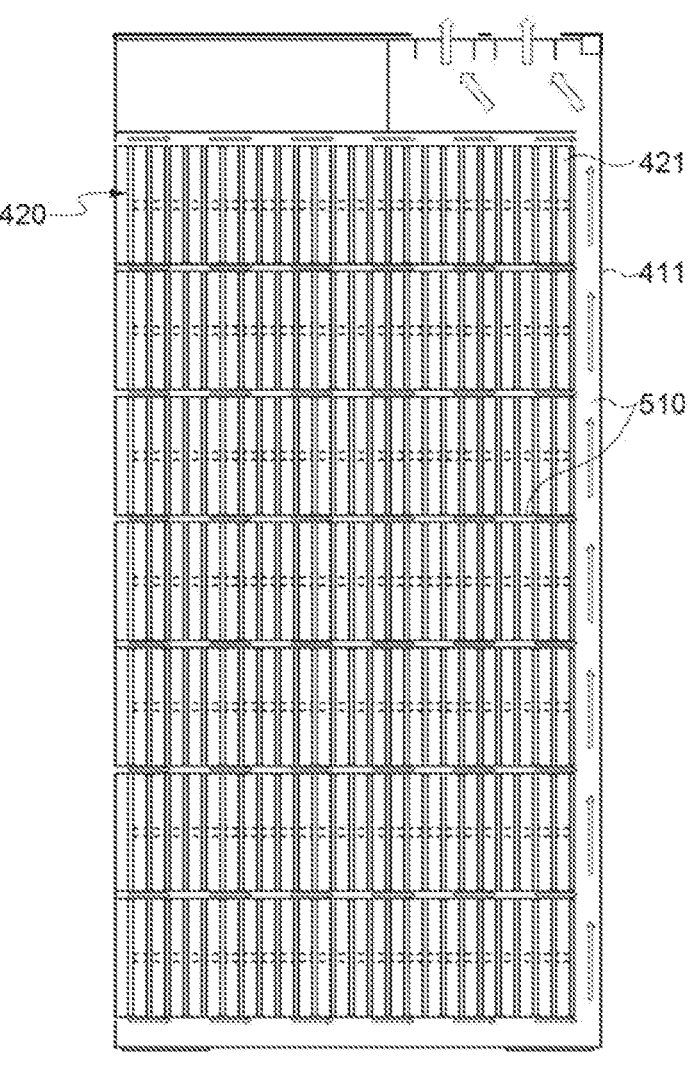
FIG. 5 is a cross-sectional view taken on line a-b in FIG. 4.
Figure 6:
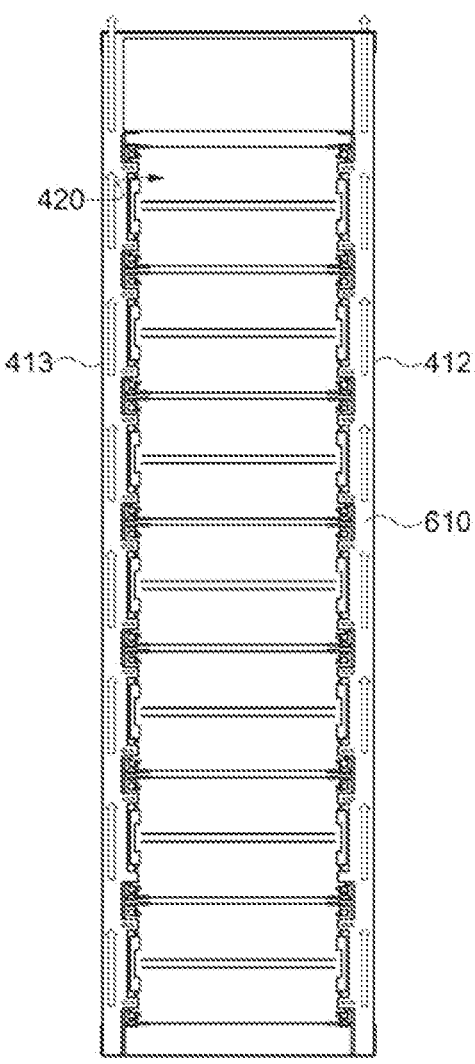
FIG. 6 is a cross-sectional view taken on line c-d in FIG. 4.
Figure 7:
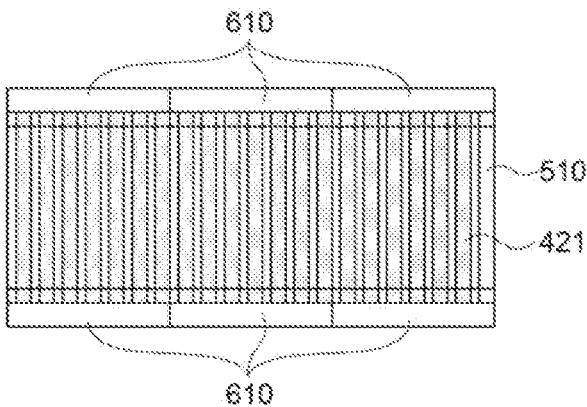
FIG. 7 is a cross-sectional view taken on line e-f in FIG. 4.

FIG. 4 is a view illustrating a battery rack according to an embodiment, FIG. 5 is a cross-sectional view taken on line a-b in FIG. 4, FIG. 6 is a cross-sectional view taken on line c-d in FIG. 4, and FIG. 7 is a cross-sectional view taken on line e-f in FIG. 4.

Referring to FIGS. 4 to 7, the battery rack 311 according to an embodiment may include a housing 410 and a plurality of battery modules 420 stacked in the housing 410.

The plurality of battery modules 420 may be electrically connected to each other by a first connection member. For example, a plurality of battery modules 420 may be connected to each other in series or parallel to form the battery rack 311.

Each battery module 420 may include a plurality of battery cells 421 stacked in a direction perpendicular to a stacking direction of the battery modules 420. The plurality of battery cells 421 may be electrically connected to each other by a second connection member. For example, the plurality of battery cells 421 may be connected to each other in series or in parallel to form the battery module 420.

According to an embodiment, the battery rack 311 may include cooling passages 510 and flame passages 610 which are physically separated from each other. Herein, the cooling passage 510 may be a path through which a cooling fluid for cooling the battery module 420 or the battery cell 421 flows, and the flame passage may be a path through which a flame or gas generated in case of fire of the battery module 420 or the battery cell 421 flows.

The cooling passages 510 may be formed in lower and upper spaces of the stacked battery modules 420, spaces between the battery modules 420, and a space on a rear cover 411 side of the housing 410. The cooling fluid may flow through the cooling passage 510 (see arrows in FIG. 5) to cool the battery modules 420. In addition, the flame passages 610 may be formed in spaces on both-side covers 412 and 413 side of the housing 410. A flame or gas generated in case of fire may flow through the flame passage 610 (see arrows in FIG. 6), and may be discharged to an outside of the battery rack 311. To this end, the housing 410 may be formed in a structure in which the cooling passage 510 and the flame passage 610 are physically separated.

According to an embodiment, the battery rack 311 may further include a battery rack controller 430.

The battery rack controller 430 may be connected to a plurality of battery modules 420 by a third connection member.

When a short circuit occurs in any one of the plurality of battery modules 420, the battery rack controller 430 cuts off the high-voltage electrical connection, thereby preventing safety accidents such as fire and explosion.

When there is a risk of fire or a fire occurs in any one of the plurality of battery modules 420, the battery rack controller 430 may execute the above-described fire coping measure.

According to an embodiment, the battery rack 311 may further include cooling fans 440.

As shown in FIG. 4, the cooling fans 440 may be located on an upper side of the plurality of stacked battery modules 420, but it is not limited thereto. That is, the cooling fans 440 may be located on a lower side of the plurality of stacked battery modules 420.

The cooling fluid that has passed through the cooling passage 510 may be discharged to the outside of the battery rack 311 through the cooling fans 440. Thereby, heat from the battery modules 420 may be radiated to the outside of the battery rack 311 to cool the battery modules 420.

Figure 8:
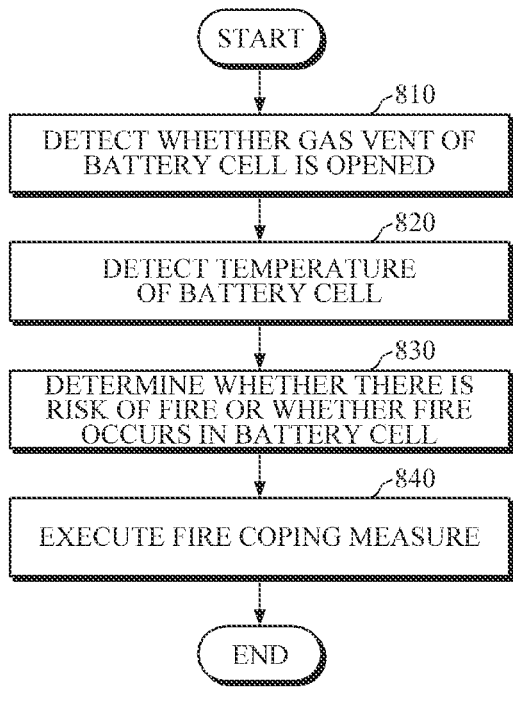
FIG. 8 is a flowchart illustrating a method of detecting a fire in a battery according to an embodiment.

FIG. 8 is a flowchart illustrating a method of detecting a fire in a battery according to an embodiment The method of detecting a fire in a battery shown in FIG. 8 may be performed by the battery fire detection device 100.

Referring to FIG. 8, the battery fire detection device may detect whether the gas vent of the battery cell is opened (810), and detect a temperature of the battery cell (820).

The battery fire detection device may determine whether there is a risk of fire or whether a fire occurs in the battery cell based on the detection results of whether the gas vent of the battery cell is opened and the detection results of the temperature of the battery cell (830).

When it is determined that the battery cell is at risk of fire or in which a fire has occurred therein, the battery fire detection device may execute a fire coping measure (840).

For example, when it is determined that the battery cell is at risk of fire or in which a fire has occurred therein, the battery fire detection device may drive the cooling device to cool the battery cell. Alternatively, the battery fire detection device may send a signal for warning of a risk of fire or an occurrence of fire to the system controller (e.g., the battery management system (BMS), etc.) that controls an operation of the system using the battery cell, thereby allowing the system controller to drive the cooling device so as to cool the battery cell.

As another example, when it is determined that the battery cell is at risk of fire or in which a fire has occurred therein, the battery fire detection device may generate a predetermined warning signal to warn the user. Alternatively, the controller may send a signal for warning of a risk of fire or an occurrence of fire to the system controller, thereby allowing the system controller to warn the user.

As another example, when it is determined that the battery cell is at risk of fire or in which a fire has occurred therein, the battery fire detection device may cut off power supply to the battery cell to stop the operation of a system using the battery cell. Alternatively, the battery fire detection device may send a signal for warning of a risk of fire or an occurrence of fire to the system controller, thereby allowing the system controller to cut off the power supply to the battery cell, thus to stop the operation of the system.

Figure 9:
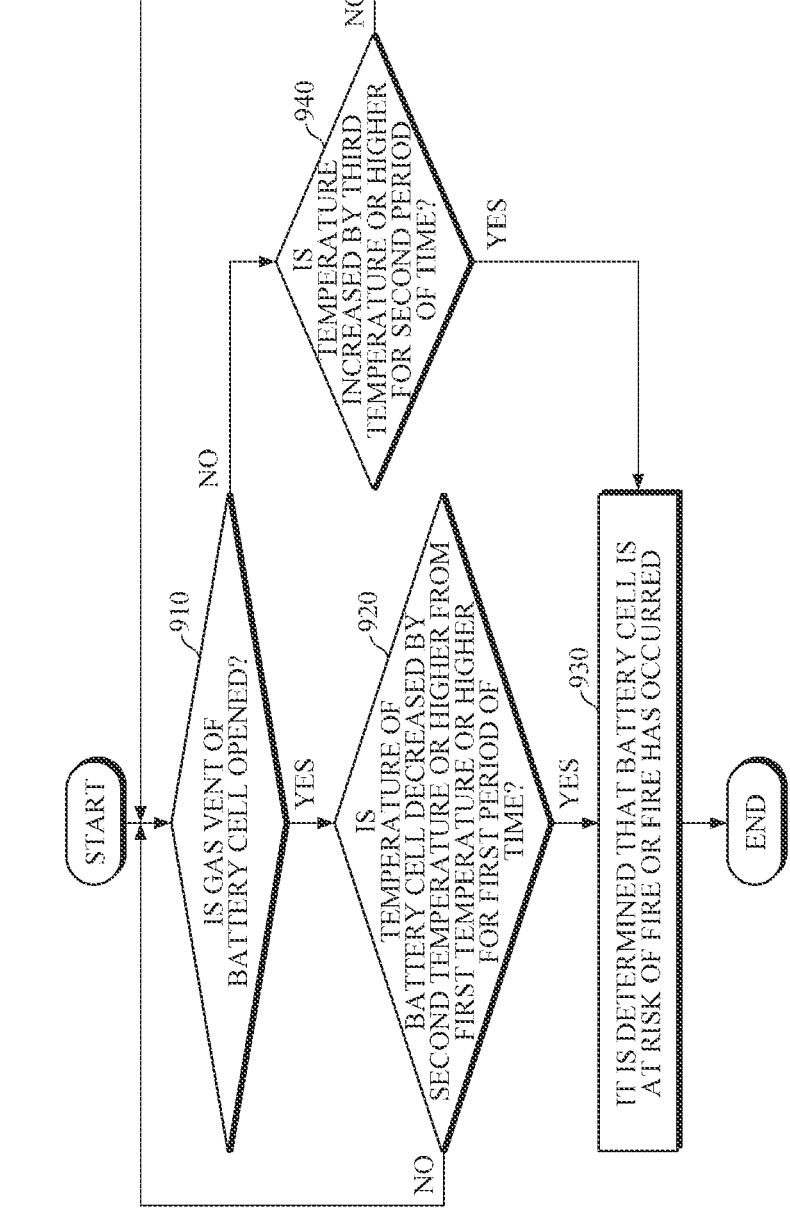
FIG. 9 is a flowchart illustrating an embodiment of step 830 of determining whether there is a risk of fire or whether a fire occurs in the battery cell of FIG. 8.

FIG. 9 is a flowchart illustrating an embodiment of step 830 of determining whether there is a risk of fire or whether a fire occurs in the battery cell of FIG. 8.

Referring to FIG. 9, the battery fire detection device may determine whether the gas vent of the battery cell is opened based on the detection results of whether the gas vent of the battery cell is opened (910).

When the gas vent of the battery cell is opened, the battery fire detection device may determine a temperature and a temperature change of the battery cell after the gas vent is opened, and may determine whether the temperature of the battery cell is decreased by the second temperature or higher from the first temperature or higher for the first period of time (920). In this case, the first temperature may be 100° C., the first period of time may be 5 seconds, and the second temperature may be 5° C., but this is only an example and it is not limited thereto.

When the temperature of the battery cell is decreased by the second temperature or higher from the first temperature or higher for the first period of time after the gas vent is opened, the battery fire detection device determines that the battery cell is at risk of fire or in which a fire has occurred therein (930), and when the temperature of the battery cell is not decreased by the second temperature or higher from the first temperature or higher for the first period of time after the discharge port is opened, the processing returns to step 910 to determine whether the gas vent of the battery cell is opened.

Meanwhile, when the gas vent of the battery cell is not opened as a result of the determination in step 910, the battery fire detection device determines a temperature change of the battery cell while the gas vent is not opened, and may determine whether the temperature of the battery cell is increased by the third temperature or higher for the second period of time while the gas vent is not opened (940). In this case, the second period of time may be 1 second and the third temperature may be 10° C., but this is only an example and it is not limited thereto.

When the temperature of the battery cell is increased by the third temperature or higher for the second period of time while the gas vent is not opened, the battery fire detection device determines that the battery cell is at risk of fire or in which a fire has occurred therein (930), and when the temperature is not increased by the third temperature or higher for the second period of time, the processing returns to step 910 to determine whether the gas vent of the battery cell is opened.

An aspect of the present invention may be implemented as a computer-readable code in a computer-readable recording medium. The codes and code segments, which implement the above program, may be easily deduced by a computer programmer in the art. The computer-readable recording medium may include all types of recording devices for storing data that can be read by a computer system. Examples of computer-readable recording medium may include ROM, RAM, CD-ROM, magnetic tape, floppy disk, optical disk and the like. Further, the computer-readable recording medium may be distributed over a computer system connected by a network, and written and implemented in computer-readable code that can be read by the computer in a distributed manner.

The present invention has been described with reference to the preferred embodiments above, and it will be understood by those skilled in the art that various modifications may be made within the scope without departing from essential characteristics of the present invention. Accordingly, it should be interpreted that the scope of the present invention is not limited to the above-described embodiments, and other various embodiments within the scope equivalent to those described in the claims are included within the present invention.

What is claimed is:

1. A battery fire detection device comprising:
a first sensor configured to detect whether a gas vent of a battery cell is opened;
a second sensor configured to detect a temperature of the battery cell; and
a controller configured to receive detection signals from the first sensor and the second sensor, and to determine whether the battery cell is at a risk of fire or whether a fire has occurred, based on at least one of the detection signals,
wherein the controller is configured to determine whether the battery cell is at a risk of fire or whether a fire has occurred using different algorithms depending on whether the gas vent is open or unopened,
wherein the controller is configured to determine, while the gas vent remains unopened, that the battery cell is at risk of fire or that a fire has occurred when the temperature of the battery cell based on detection results of the second sensor detecting the temperature of the battery cell increases by at least a third temperature over a second period of time,
wherein the controller is further configured to determine whether the gas vent is opened, and after the gas vent is opened and based on the detection results of the second sensor detecting the temperature of the battery cell, determine that the battery cell is at risk of fire or that a fire has occurred when the temperature of the battery cell decreases by at least a second temperature over a first period of time, and
wherein when the temperature of the battery cell does not decrease by the at least the second temperature from a first temperature over the first period of time, the controller is further configured to redetermine whether the gas vent is opened.

2. The battery fire detection device according to claim 1, wherein the first temperature is 100° C., the first period of time is 5 seconds, and the second temperature is 5° C.

3. The battery fire detection device according to claim 1, wherein the second period of time is 1 second, and the third temperature is 10° C.

4. An energy storage system comprising: a battery rack; a cooling device configured to cool battery cells included in the battery rack;

a battery fire detection device configured to determine whether there is a risk of fire or whether a fire occurs in the battery cell included in the battery rack; and a battery management system configured to execute a fire coping measure when there is a battery cell at risk of fire or in which a fire has occurred therein, wherein the battery fire detection device comprises:

a first sensor configured to detect whether a gas vent of the battery cell is opened;

a second sensor configured to detect a temperature of the battery cell; and a controller configured to receive detection signals from the first sensor and the second sensor, and to determine whether the battery cell there is at a risk of fire or whether a fire has occurred in the battery cell based on at least one of the detection signals, wherein the controller is configured to determine whether the battery cell is at a risk of fire or whether a fire has occurred using different algorithms depending on whether the gas vent is open or unopened, wherein the controller is configured to determine, while the gas vent remains unopened, that the battery cell is at risk of fire or that a fire has occurred when the temperature of the battery cell based on detection results of the second sensor detecting the temperature of the battery cell increases by at least a third temperature over a second period of time, the controller is further configured to determine whether the gas vent is opened, and after the gas vent is opened and based on the detection results of the second sensor detecting the temperature of the battery cell, determine that the battery cell is at risk of fire or that a fire has occurred when the temperature of the battery cell decreases by at least a second temperature over a first period of time, and wherein when the temperature of the battery cell does not decrease by the at least the second temperature from a first temperature over the first period of time, the controller is further configured to redetermine whether the gas vent is opened.

5. The energy storage system according to claim 4, wherein battery rack comprises:

a housing;

a plurality of battery modules which are stacked in the housing and include a plurality of battery cells; and cooling passages and flame passages which are physically separated from each other.

6. The energy storage system according to claim 5, wherein the cooling passages are formed in upper and lower spaces of the stacked battery modules, spaces between the stacked battery modules, and a space on a rear cover side of the housing, and the flame passage is formed in spaces on both-side covers side of the housing.

7. The energy storage system according to claim 4, wherein, when there is a battery cell at risk of fire or in which a fire has occurred therein, the battery management system drives the cooling device to cool the battery cell at risk of fire or in which a fire has occurred therein.

8. The energy storage system of claim 4, wherein, when there is a battery cell at risk of fire or in which a fire has occurred therein, the battery management system generates and provides a predetermined warning message to a user.

9. The energy storage system according to claim 4, wherein, when there is a battery cell at risk of fire or in which a fire has occurred therein, the battery management system cuts off power supply to the battery cell or the battery rack at risk of fire or in which a fire has occurred therein.

* * * * *